(12) United States Patent
Emmanuel et al.

(10) Patent No.: US 10,237,834 B2
(45) Date of Patent: *Mar. 19, 2019

(54) SYSTEMS AND METHODS FOR WIRELESS LINK BALANCING IN WIRELESS NETWORKS

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/004,135

(22) Filed: Jun. 8, 2018

(65) Prior Publication Data

US 2018/0295589 A1 Oct. 11, 2018

Related U.S. Application Data

(63) Continuation of application No. 15/693,406, filed on Aug. 31, 2017, now Pat. No. 10,021,655, which is a continuation of application No. 15/287,714, filed on Oct. 6, 2016, now Pat. No. 9,860,855, which is a (Continued)

(51) Int. Cl.
*H04W 52/28* (2009.01)
*H04L 12/26* (2006.01)
*H04W 72/04* (2009.01)
*H04W 84/12* (2009.01)

(52) U.S. Cl.
CPC ........... *H04W 52/283* (2013.01); *H04L 43/12* (2013.01); *H04W 72/0473* (2013.01); *H04W 84/12* (2013.01)

(58) Field of Classification Search
CPC .......... H04W 52/283; H04W 72/0473; H04W 84/12; H04L 43/12
See application file for complete search history.

(56) References Cited

U.S. PATENT DOCUMENTS

| 6,486,769 B1 | 11/2002 | McLean |
| 6,571,083 B1 | 5/2003 | Powell et al. |
| 7,885,144 B2 | 2/2011 | Oswal et al. |

(Continued)

FOREIGN PATENT DOCUMENTS

| CN | 1273493 A | 11/2000 |
| CN | 1723630 A | 1/2006 |
| CN | 101421990 A | 4/2009 |

*Primary Examiner* — Mohammad S Anwar
(74) *Attorney, Agent, or Firm* — Perkins Coie LLP

(57) ABSTRACT

Systems and methods for controlling the transmit power and the receive sensitivity of an access point for achieving symmetric link balancing is described. When an access point operates with symmetric link performance, the access point does not inefficiently use available bandwidth for transmitting or re-transmitting to a client station that cannot communicate with the access point. Moreover, the access point does not back off transmissions due to activity of neighboring basic service sets when not needed. The receive sensitivity can be controlled using a hardware attenuator or software commands that adjust a programmable gain in a wireless local area network chipset used by the access point, or it can be controlled using adjustable levels in the software for processing or responding to packets.

20 Claims, 10 Drawing Sheets

Related U.S. Application Data continuation of application No. 14/092,704, filed on Nov. 27, 2013, now Pat. No. 9,467,953.

(60) Provisional application No. 61/843,797, filed on Jul. 8, 2013.

(56) References Cited

U.S. PATENT DOCUMENTS

| | | |
|---|---|---|
| 9,467,953 B2 | 10/2016 | Emmanuel et al. |
| 10,021,655 B2 * | 7/2018 | Emmanuel .......... H04W 52/283 |
| 2002/0123349 A1 | 9/2002 | Miyoshi et al. |
| 2002/0151332 A1 | 10/2002 | Eddy et al. |
| 2002/0183011 A1 | 12/2002 | Eddy |
| 2003/0119523 A1 | 6/2003 | Bulthuis et al. |
| 2006/0264229 A1 | 11/2006 | Guo et al. |
| 2007/0099677 A1 | 5/2007 | Hsu et al. |
| 2010/0039969 A1 | 2/2010 | Sukenari et al. |
| 2011/0195730 A1 | 8/2011 | Chami et al. |
| 2012/0170514 A1 | 7/2012 | Lo et al. |
| 2013/0136018 A1 | 5/2013 | Jeong et al. |
| 2013/0258812 A1 | 10/2013 | Wala et al. |
| 2016/0066227 A1 | 3/2016 | Townend |

* cited by examiner

SYSTEMS AND METHODS FOR WIRELESS LINK BALANCING IN WIRELESS NETWORKS

CROSS-REFERENCES TO RELATED APPLICATIONS

This application is a continuation application of U.S. patent application Ser. No. 15/693,406, filed Aug. 31, 2017, which is a continuation application of U.S. patent application Ser. No. 15/287,714, filed Oct. 6, 2016, which issued as U.S. Pat. No. 9,860,855 on Jan. 2, 2018, which is a continuation application of U.S. patent application Ser. No. 14/092,704, filed Nov. 27, 2013, which issued as U.S. Pat. No. 9,467,953 on Oct. 11, 2016, which claims the benefit of and/or the right of priority to U.S. Provisional Patent Application No. 61/843,797, which was filed on Jul. 8, 2013; the contents of which are incorporated by reference in their entirety herein.

FIELD

The disclosed techniques relate to adjusting wireless link performance of access points in a wireless local area network that has multiple access points.

BACKGROUND

The IEEE (Institute of Electrical and Electronics Engineers) 802.11h standard defines a transmit power control (TPC) mechanism for reducing interference between wireless networks by reducing the radio transmit power of WLAN (wireless local area network) devices. TPC can also be used to manage power consumption of wireless devices and to adjust the range between access points and client stations.

When an access point sends frames of data to a client station, it specifies whether TPC is supported, the maximum transmit power allowed in the WLAN, and the transmit power currently used by the access point. The transmit power used by client stations associated with an access point are not permitted to exceed the maximum limit set by the access point.

SUMMARY

Systems and methods for controlling the transmit power and the receive sensitivity of an access point in a wireless network for achieving symmetric link balancing is described. When an access point operates with symmetric wireless link performance, the effects are to push a long-range client station to associate with and join a closer access point to the client station, rather than a more distant access point; to allow many WLAN networks to coexist in one area; and to eliminate or reduce WLAN probe response traffic to long range clients and unnecessary back offs due to the activity of overlapping basic service sets (BSSs) at a distance, thus, increasing the useful traffic sent between access points and close-range client stations.

The receive sensitivity can be controlled using a hardware attenuator for adjusting the receiver gain. Alternatively, software commands can be used by a controller to adjust a programmable gain in a wireless local area network chipset used by the access point.

Receiver thresholds that determine whether a packet is processed may be modified to change the sensitivity of a receiver. For example, to detect the beginning of IEEE 802.11 packets, an auto correlation or cross correlation function can be used and compared to a threshold, and the threshold may be modified to change the receiver sensitivity.

A received packet may be ignored or not fully processed when the received power level of a packet is lower than a defined threshold. For example, when a probe request is received that has a power level lower than a defined value, it will not trigger a probe response. The same methodology may be applied to an association request, a re-association request, an authentication request, or other management or data packets.

Network allocation vector (NAV), a virtual carrier sensing mechanism, may not be held to apply to for packets that are lower than a predetermined power level. The energy detect (ED) threshold may also be modified accordingly. The use of NAV and ED thresholds may be bypasssed so that the access point can transmit packets even when a client station at a far distance is transmitting on the same channel to another access point.

BRIEF DESCRIPTION OF THE DRAWINGS

Examples of a wireless link balancing system are illustrated in the figures. The examples and figures are illustrative rather than limiting.

DETAILED DESCRIPTION

In an environment where there are multiple access points available for a client station to associate with, the client station does not necessarily associate with the closest access point. Moreover, even if a client station initially associates with the closest access point, if the client station moves farther away from the access point, the client station may maintain an association with the original access point when it is no longer the closest access point. In this situation, the bandwidth of the WLAN is not used efficiently by the access points and client stations. Further, clients not associated with a close access point may not achieve the throughput or the quality of service (QoS) that it may otherwise achieve when associating with the closest access point.

Figure 1:
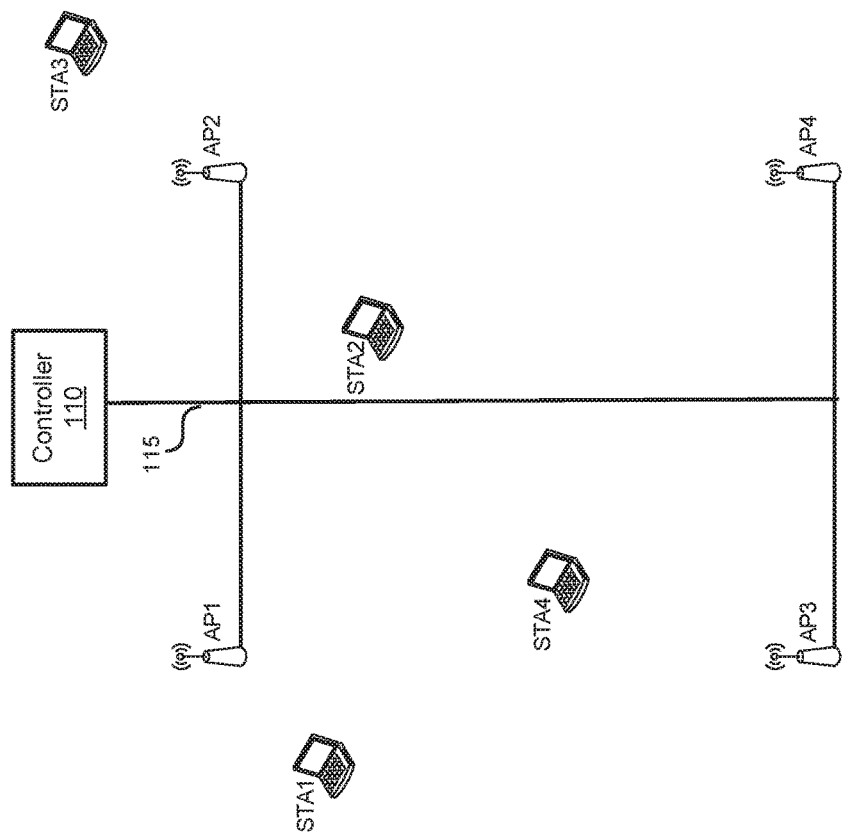
FIG. 1 shows devices that are part of an example WLAN (wireless local area network).

FIG. 1 shows devices that are part of an example WLAN (wireless local area network), such as may be found in an office building or apartment complex. The WLAN includes multiple access points or base stations, AP1, AP2, AP3, and AP4. Each access point is coupled via a bus 115 to controller 110 and also wirelessly transmits signals to and receives signals from client stations. The controller 110 can send TPC commands as well as commands to adjust receiver sensitivity to each of the access points.

As shown in FIG. 1, there can be multiple client stations, STA1, STA2, STA3, and STA4 in the WLAN environment. These client stations may be associated with or seek to associate with one of the access points, AP1, AP2, AP3, and AP4. The access points and client stations exchange data wirelessly using a time division multiplexing (TDM) protocol.

Typically, the links between an access point and a client station are asymmetric, that is, the link budget for a transmission from the access point to a client station and the link budget for a transmission in the reverse direction from the client station to the access point is not the same. In particular, with the use of TPC to adjust the transmission power level of the access point, the asymmetry of the links can be exacerbated. For example, for an access point that has a transmit power of +17 dBm and a receive sensitivity of −95 dBm, and for a client station that has a transmit power of +23 dBm and a receive sensitivity of −95 dBm, the access point to client station link budget is 112 dB (=+17 dBm+95 dBm), while the link budget for a client station transmission to the access point is 118 dB (=+23 dBm+95 dBm). In this case, there is a link budget asymmetry of 6 dB (118 dB−112 dB). For this scenario, where the distance between the client station and the access point is large enough that the client station is outside the range where it can receive signals from the access point, the access point may still be capable of receiving signals from the client station.

Another way of looking at the link budget is to use the concepts of transmit radius and receive radius. The transmit radius is the maximum distance that the client station can be located from the access point while still ensuring that the client station can receive signals from the access point, while the receive radius is the maximum distance that the client station can be located from the access point while still ensuring that the access point can receive signals from the client station. An access point has an asymmetric link performance with respect to a client station when its transmit radius and its receive radius are not substantially the same. For access points that adhere to the IEEE 802.11h protocol for TPC, adjustment of solely the transmit power can exacerbate the asymmetry in the wireless link of the access point.

Figure 2:
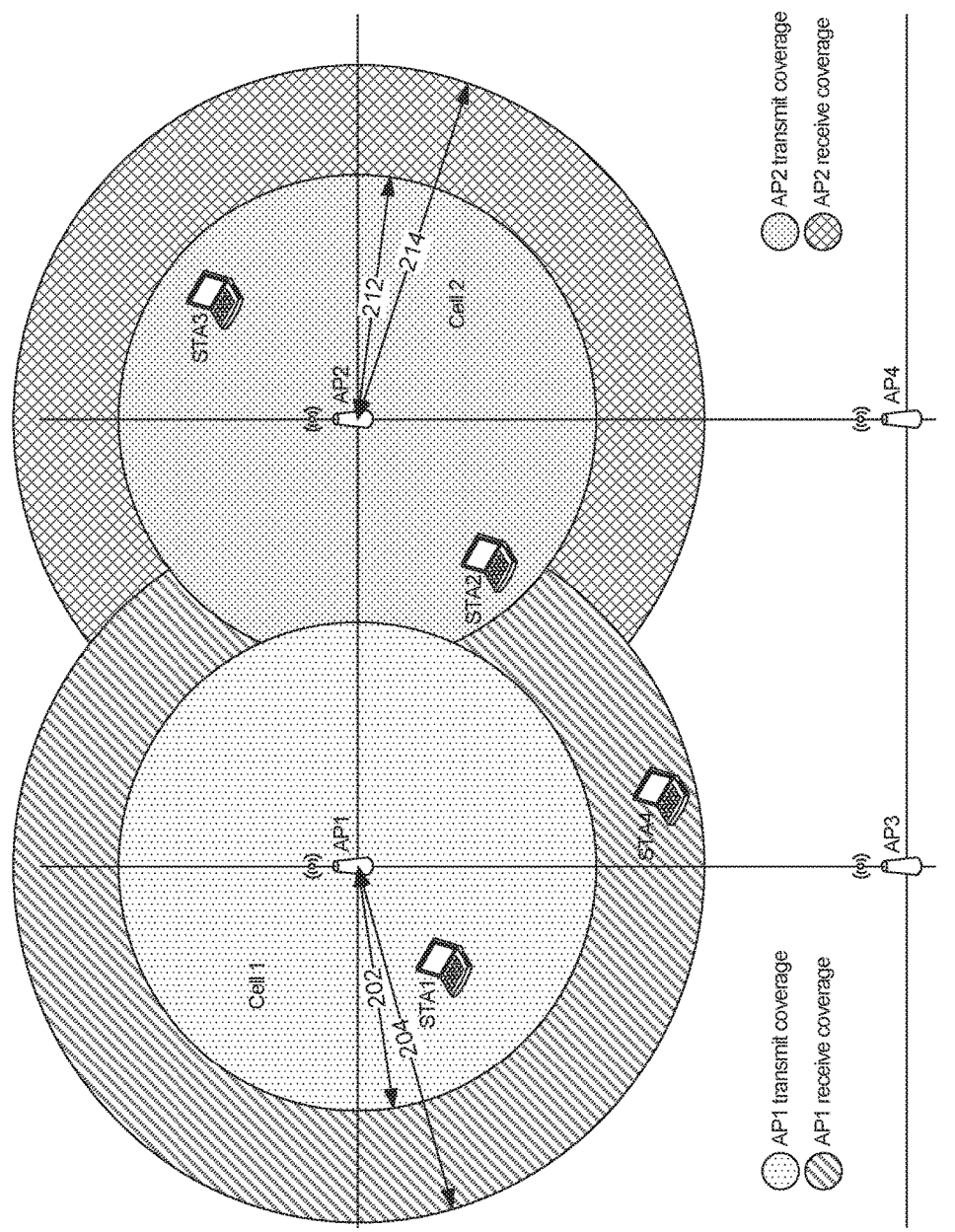
FIG. 2 shows example asymmetric links for two access points, where the transmit radius of an access point is different from the receive radius for that access point.

Practically, one of the effects of an asymmetric link budget is inefficient use of the TDM system bandwidth. FIG. 2 shows example asymmetric link performance for AP1 and AP2. For both AP1 and AP2, the transmit radius 202, 212 for transmission coverage is significantly smaller than the respective receive radius 204, 214 for reception coverage. Because the transmit radius and the receive radius is dependent upon a particular client station's operating parameters, the transmit radius 202, 212 and receive radius 204, 214 depicted in FIG. 2 are example radii based upon a typical client station, for example, an Apple iPhone®. Additionally, STA1 is within the transmit radius 202 and the receive radius 204 of AP1, and STA2 is within the transmit radius 212 and receive radius 214 of AP2, thus, no problems arise from communications between AP1 and STA1 or from communications between AP2 and STA2 due to the respective asymmetric link performance of AP1 and AP2.

However, if STA2 is connected to AP1, even though AP2 is closer, the asymmetric link performance for AP1 results in inefficient use of the TDM system bandwidth. This situation may arise if STA2 is initially within the transmit radius 202 of AP1 and initially associates with AP1. Then if STA2 moves beyond the transmit radius 202 of AP1 but still stays within the receive radius 204 of AP1, as indicated by the location of STA2 in FIG. 2, transmissions sent by STA2 to AP1 are received by AP1, but transmissions from AP1 are not necessarily received by STA2. Consequently, AP1 may need to re-send transmissions more than once to STA2, thus using additional wireless air bandwidth. The resulting data rate between AP1 and STA2 is lower than the potential communications data rate that can be established between AP2 and STA2 because STA2 is within the transmit radius 212 of AP2, thus not requiring additional bandwidth to be used in re-sending a transmission from AP2 to STA2.

FIG. 2 also shows that STA4 is located outside the transmit radius 202 of AP1 but within the receive radius 204 of AP1, similar to the situation with STA2. In this scenario, if STA4 is not already associated with AP1, a probe request from STA4 to associate with AP1 can reach AP1, but a probe response from AP1 cannot reach STA4. Then bandwidth is wasted by AP1 repeatedly attempting to send a probe response to STA4 because STA4 is too far away.

Additionally, when the receive radius of a first access point or client station is large enough such that the first access point or client station can receive and decode packets transmitted between other access points and client stations, the first access point or client station may unnecessarily back off from transmitting packets. As a result, the first access point or client station may not achieve the same transmission throughput that it can receive. The IEEE 802.11 standard defines carrier sense multiple access with collision avoidance (CSMA/CA) mechanisms that set out several criteria for which a WLAN access point or client station may check before it assumes that the wireless channel is clear. One of the mechanisms is physical carrier sensing which compares the signal level on the wireless channel with an energy detect (ED) threshold. If an access point or client station detects a signal that is above a certain threshold, it assumes that the wireless channel is busy and will not contend for the wireless medium. Another mechanism is the Network Allocation Vector (NAV) which is a virtual carrier sensing mechanism used with wireless network protocols such as IEEE 802.11. Virtual carrier sensing is a logical abstraction that limits the need for physical carrier sensing. The media access control (MAC) layer frame headers contain a duration field that specifies the transmission time required for the frame, that is, the time during which the wireless medium will be busy. The stations listening in on the wireless medium read the duration field and set their NAV, which is an indicator for a station on the duration it must defer from accessing the medium. Thus, an access point or a station whose receive radius is large compared to that of a typical wireless device may detect packet exchanges between other wireless devices, and it may avoid transmitting because of the application of either ED or NAV mechanisms. Therefore, a device with a very sensitive receiver may contend less frequently for the medium, and transmit less frequently, resulting in a lower throughput.

Figure 3:
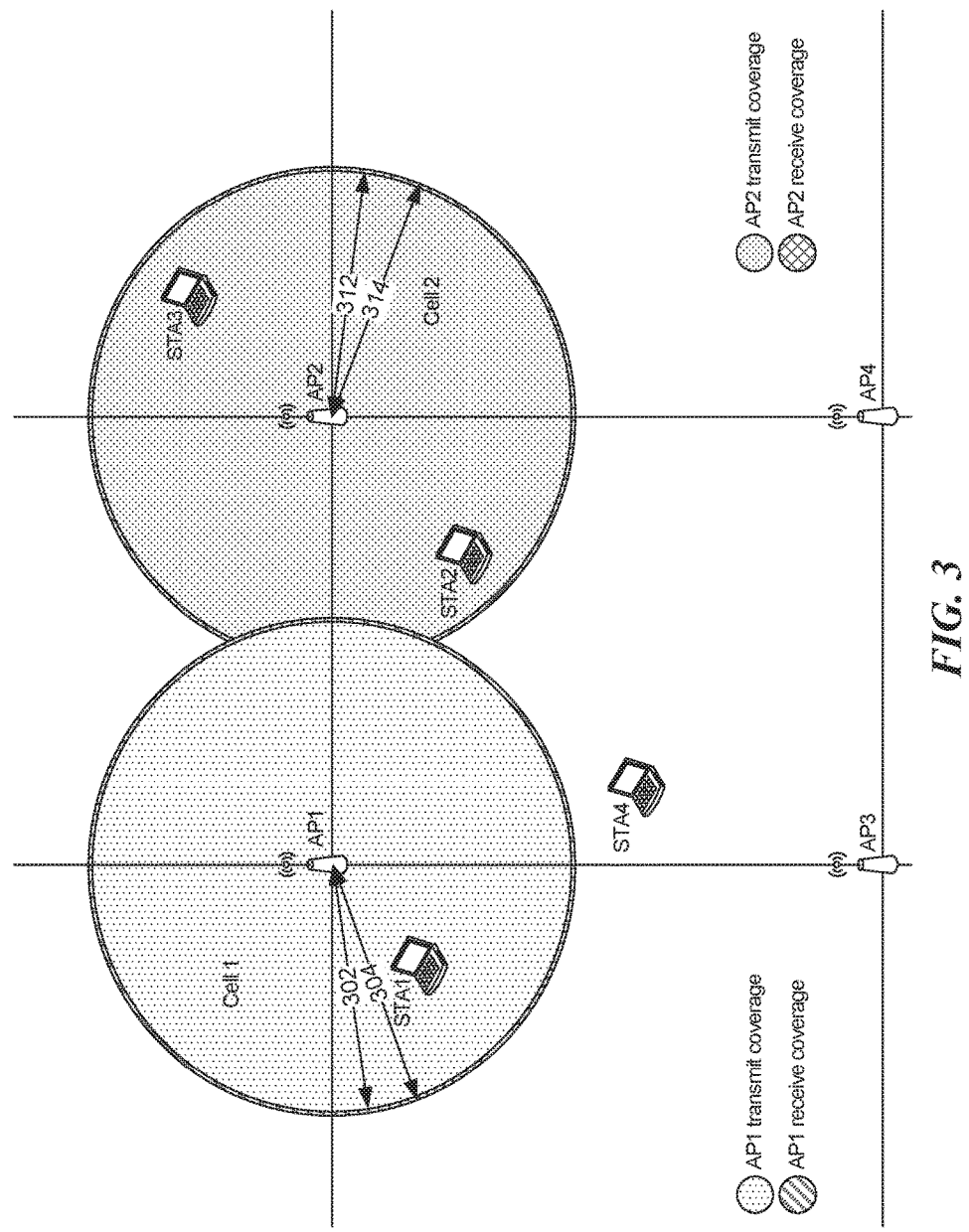
FIG. 3 shows example symmetric links for two access points, where the transmit radius of an access point is substantially the same as the receive radius for that access point.

To eliminate the problems arising from asymmetric link performance of an access point, the receiver sensitivity of each access point can be adjusted so that the receive radius of the access point is substantially the same as the transmit radius of the access point. FIG. 3 shows an example where the links for AP1 and AP2 are substantially symmetrical, that is, the transmit radius 302 and the receive radius 304 of the access point AP1 are substantially the same, and the transmit radius 312 and the receive radius 314 of the access point AP2 are substantially the same.

With an access point that has symmetric link performance, the situation described above with respect to STA2 being located beyond the transmit radius of AP1 and yet within the receive radius of AP1 will not arise. For example, if STA2 initially associates with AP1 while located within the transmit radius 302 of AP1, when STA2 moves beyond the transmit radius 302 of AP1, it has also moved beyond the receive radius 304 of AP1. This means that AP1 will no longer be able to hear transmissions from STA2, nor will AP1 be able to send transmissions to STA2. As a result, STA2 will no longer be able to associate with AP1 and will initiate probe requests, authentication requests, or association requests to find and associate with another access point located closer, such as AP2 in FIG. 3. Essentially, by maintaining symmetric link performance for access points, client stations that establish an association with a first access point and subsequently move away from that first access point will be pushed to associate with an access point closer its new location.

Additionally, when an access point has symmetric link performance, the access point will only be able to receive probe requests and other packets from client stations that are within range for receiving the corresponding probe response or other IEEE 802.11 response packets. Access points having symmetric link performance will no longer receive probe requests and other packets from long range client stations that are far away. In the example of FIG. 3, STA4 is positioned outside of both the transmit radius 302 and the receive radius 304 of AP1, so AP1 will no longer receive probe requests form STA4. STA4 will seek to associate with a closer access point, such as AP3. The effect is to reduce or even eliminate WLAN probe response traffic to long range client stations, thus, ultimately resulting in an increase in useful traffic between an access point and near range client stations.

Moreover, an access point with a balanced link will not back off from contention or transmission because of a packet exchange occurring between two other devices that are not impacted by its transmission. This means that when an access point transmits a packet on a channel while another packet exchange is occurring on the same channel, if the other packet exchange is at a sufficiently distant location, the access point's transmission may not impact the packet exchange at the distant location.

In some situations, the other packet exchange may be impacted, but the impact is minimal. For example, if the signal to noise ratio of the other packet exchange is sufficiently high such that the intended recipient of the packet exchange is able to receive the information in the packet, then the impact is considered minimal.

The access point determines whether or not it will have no impact or minimal impact on the other detected packet exchange based on two criteria. The first criterion is that the signal strength of the other detected packet exchange should be less than a certain threshold. The second criterion is that the selected modulation of the signal used by the other packet exchange is at a sufficiently low data rate because if interference is created by the access point's transmission, a low data rate modulation, such as differential phase-shift keying (DPSK), will not be affected as much as in the case where the modulation is occurring at a very high modulation data rate. The modulation method can be determined by examining the preamble of the packet which specifies the method of modulation.

Additionally, wireless link balancing of access points in a WLAN will allow multiple WLAN networks to coexist because a link balanced access point will support an increase in frequency reuse. The frequency reuse factor is the rate at which the same frequency can be used in the network. When the link is not balanced, the access point may be impacted by receiving and processing some packets for which it is not desirable to receive or process, for example, a probe request, an authentication request, an association request, data packets, or other types of packets received from a distant client station. Alternatively or additionally, an access point that receives and processes undesirable packets could back off from transmission of packets because criteria used by the access point identify the channel as being busy. When the transmit power of a given access point is too high, that access point will increase interference between other access points and client stations that are beyond the reach of that access point's receiver, resulting in a reduction in the capacity of neighboring access points.

In some embodiments the access point may store a single receive threshold, receiver settings, or maximum transmit power for a typical client. A typical client may be a typical cell phone, personal computer, television, or other deployed commercial devices. In these cases, the access point may also check the received signal strength of packets transmitted by neighboring access points when it calculates the receive threshold, receiver settings, or maximum transmit power. The receive threshold, receiver settings, or maximum transmit power are also determined as a function of the type of environment in which the network equipment is deployed and the path loss between the receiver and transmitter. The environment includes variables such as whether the network is in a home or office, and also the region in which the network is deployed, e.g., United States, Europe, and Asia, because the type of building materials vary from region to region.

For a stored receive threshold or receiver settings, the corresponding receive radius is determined, and the transmit radius can be set to be substantially equal to the receive radius. In some situations, the transmit radius can be greater than the receive radius, and the network with the access point will perform well, although neighboring networks with other access points may be adversely impacted. Similarly, for a stored maximum transmit power, the corresponding transmit radius is determined, and the receive radius should be substantially the same as the transmit radius.

In some embodiments, the access point may store and use a different receive radius for different clients by using software to maintain a status for each known clients. The status includes information provided by the client station when associating with the access point, for example, data rates supported by the client station, capabilities of the client station, and country information. Other content of the packet exchanges and other information elements can also be used to infer the transmit and receive capability of the client station, for example, the access point can determine the received power level of packets from the client station after a packet exchange with the client station, and this information is stored as part of the status of the client station. Thus, on the transmit side, the access point can choose a maximum transmit power using TPC based on the status maintained for each known client station.

The access point will process or receive packets from a known client only if the received signal strength and/or its data rate is above a certain threshold that is calculated for that specific client. The access point can identify the transmitter of a packet by reading the header of a packet (e.g. IEEE 802.11 MAC headers). When the access point recognizes the source of a packet, it decides whether to process the packet further or abort the reception of the packet. In these cases, the hardware receive sensitivity may be fixed to a particular value while the software threshold for processing may be changed for each client based on the capabilities of that client.

The access point can use a default receive threshold and transmit power for clients whose capabilities are not yet known to the access point. The default receive or transmit settings may be calculated for a typical client, and the receive power of neighboring access points may also be taken into account.

Figure 4A:
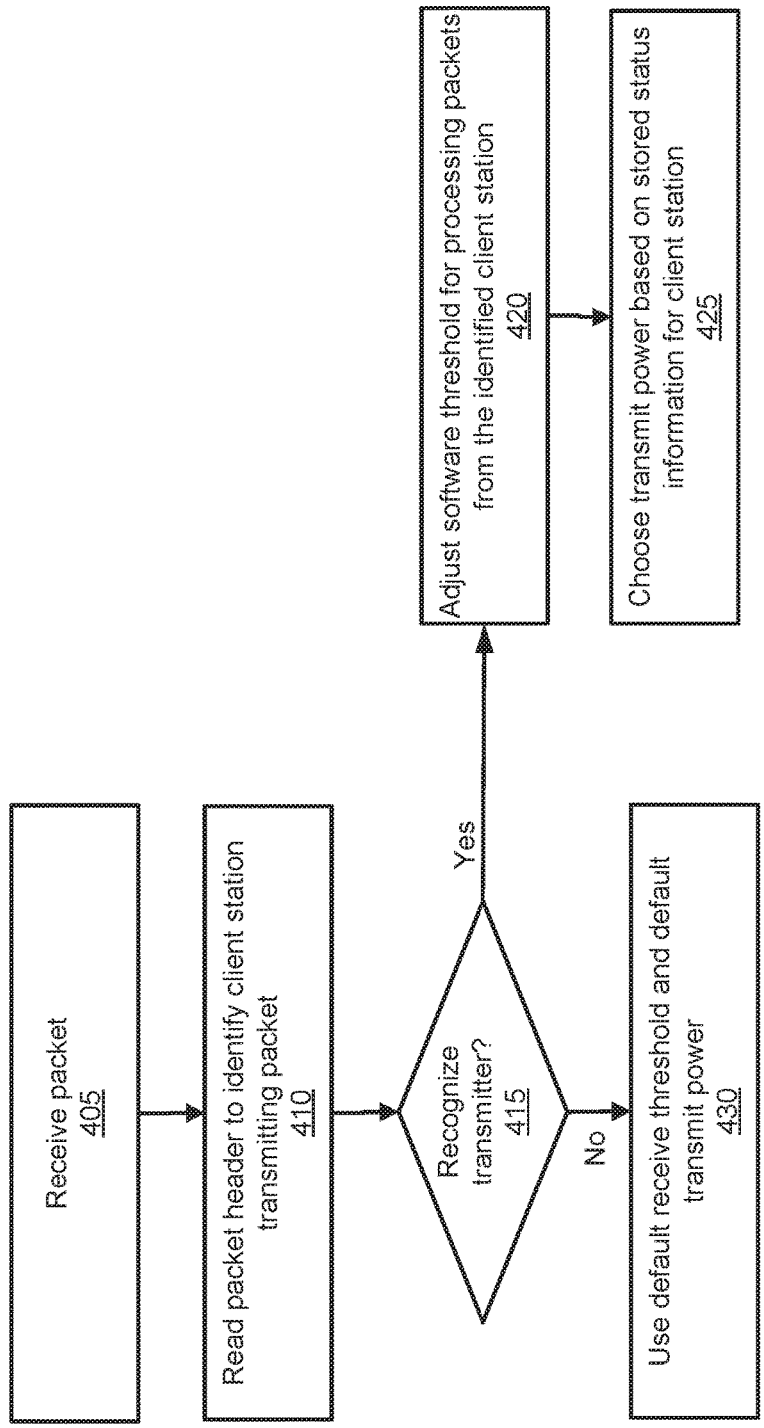
FIG. 4A is a flow diagram illustrating an example process of determining and setting receive sensitivity and transmit power.

To achieve and maintain symmetric link performance for an access point, a link balancing process is performed. FIG. 4A is a flow diagram illustrating an example process of determining and setting receive sensitivity and transmit power.

At block 405, the access point receives a packet, and block 410, the access point identifies the client station that transmitted the packet by reading the header of the packet. Then at decision block 415, the access point determines whether it recognizes the transmitter, that is, whether the client station is presently associated with the access point. If the access point recognizes the client station (block 415—Yes), at block 420, the access point adjusts the receive sensitivity threshold for processing packets from the client station. The adjustment can include adjusting hardware programmable gain elements for the receive sensitivity, and/or the software threshold for processing packets from the client station. Then at block 425, the access point selects the transmission power to use with the client station based on the stored status information for the client station.

If the access point does not recognize the client station (block 415—No), at block 430 the access point uses a default receive sensitivity threshold and default transmit power. The default receive sensitivity threshold and transmit settings are calculated using parameters, such as transmission power and receive sensitivity, for a typical client.

Figure 4B:
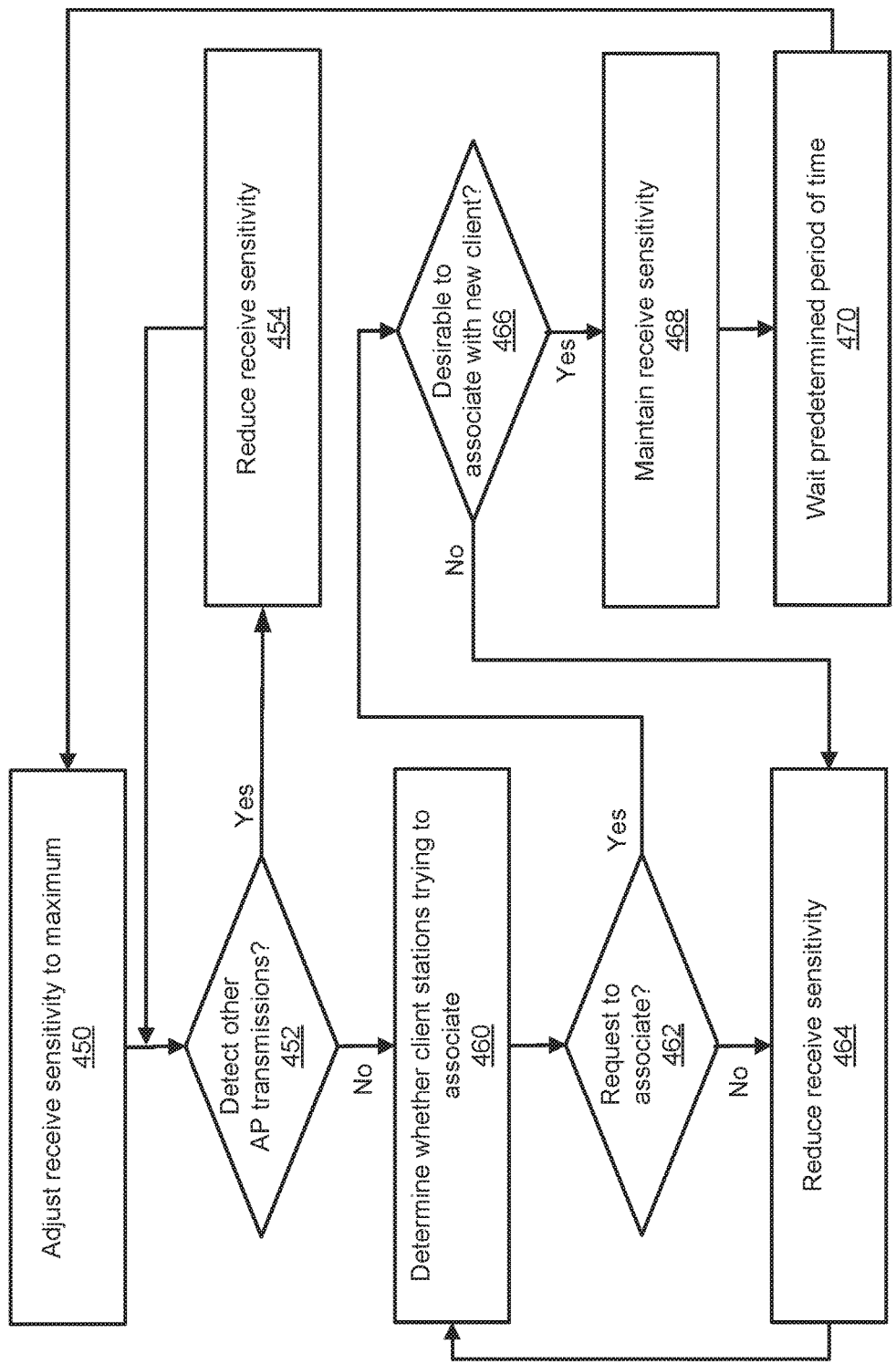
FIG. 4B is a flow diagram illustrating an example process of an access point re-adjusting its receive sensitivity.

Periodically, the access point can also re-adjust the receive sensitivity to the maximum receive sensitivity (receive radius) to check for any client stations that may be attempting to associate with the access point and also to ensure that it does not back off from transmitting packets unnecessarily when a distant packet exchange is occurring. FIG. 4B is a flow diagram illustrating an example process of an access point re-adjusting its receive sensitivity.

At block 450, the access point adjusts its receive sensitivity to maximum. Then at decision block 452, the access point determines whether transmissions to and from other access points are occurring on the channel. The criteria for determining detection of transmissions can be customized, for example, the access point can determine that no transmissions are detected if it detects transmissions less than a certain percentage of time, or if no transmissions are detected at all for a specified time interval. If transmissions are detected (block 452—Yes), at block 454, the access point reduces its receive sensitivity and returns to decision block 452.

If no transmissions with other access points are detected (block 452—No), at block 460, the access point determines whether there are client stations trying to associate with it.

If requests to associate are not detected (block 462—No), at block 464, the access point reduces its receive sensitivity, and the process returns to block 460.

If a request to associate is detected (block 462—Yes), at decision block 466, the access point determines whether it is desirable to associate with a new client station. The decision as to whether the new client station attempting to associate with the access point is desirable can be based on the signal strength of the received packet from the new station, the modulation rate of the signal, and/or whether the data rate can be adjusted appropriately based upon feedback between the access point and the new client station for known transmitted data packets, as described in the IEEE 802.11n standard. If it is not desirable to associate with the new client station (block 466—No), at block 464, the process returns to block 464.

If it is desirable to associate with the new client station (block 466—Yes), at block 468, the access point maintains its present receive sensitivity. Then at block 470, the access point waits a predetermined period of time before the process returns to block 450.

Figure 4C:
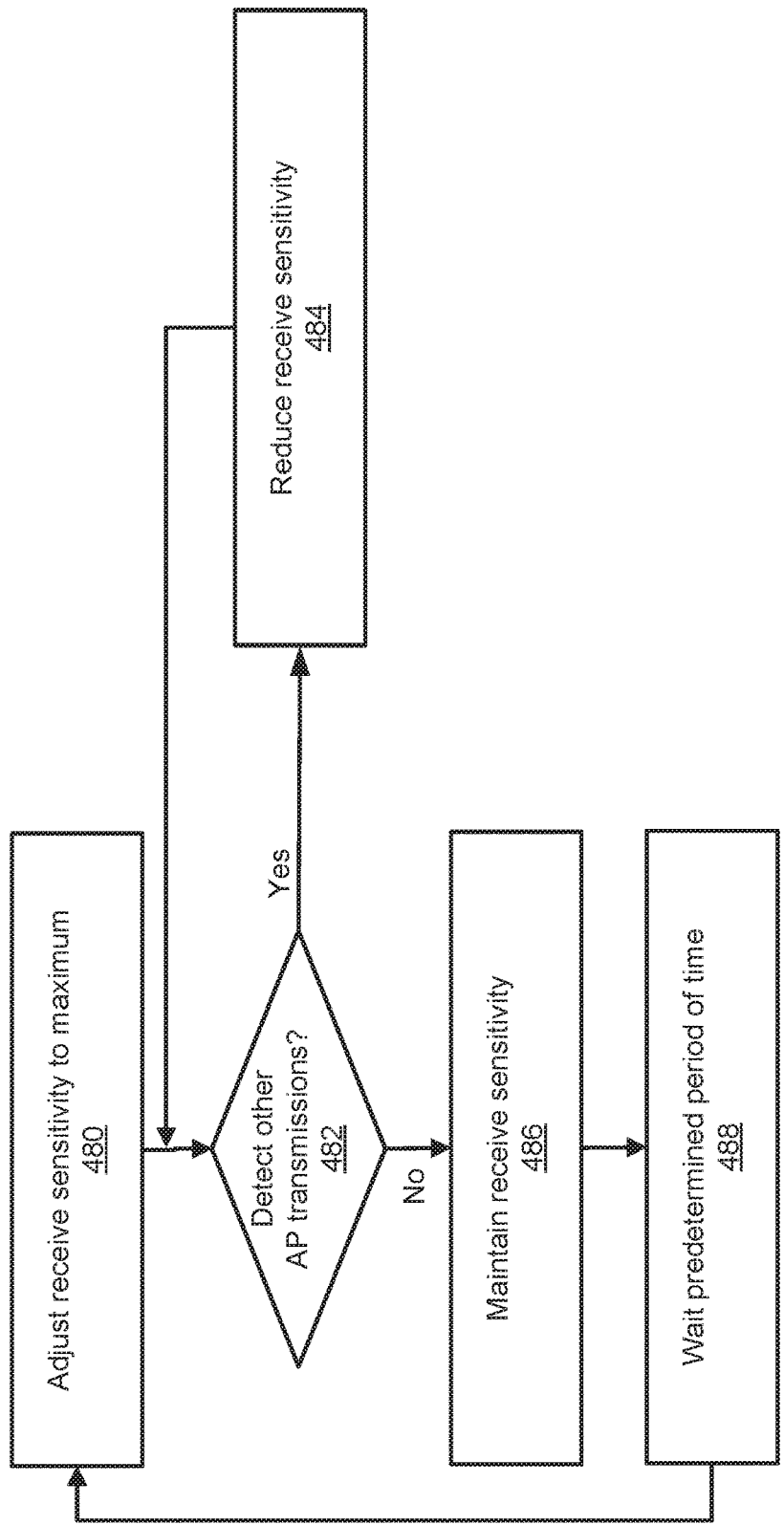
FIG. 4C is a flow diagram illustrating an example process of a client station re-adjusting its receive sensitivity.

In a similar manner, a client station can also periodically re-adjust its receive sensitivity to ensure that it does not back off from transmitting packets unnecessarily when a distant packet exchange is occurring. FIG. 4C is a flow diagram illustrating an example process of a client station re-adjusting its receive sensitivity.

At block 480, the client station adjusts its receive sensitivity to maximum. Then at decision block 482, the client station determines whether transmissions to and from access points other than the access point the client station is currently associating with are occurring on the channel. The criteria for determining detection of transmissions can be customized, for example, the client station can determine that no transmissions are detected if it detects transmissions less than a certain percentage of time, or if no transmissions are detected at all for a specified time interval. If transmissions are detected (block 482—Yes), at block 484, the client station reduces its receive sensitivity and returns to decision block 482.

If no transmissions with other access points are detected (block 482—No), at block 486, the client station maintains its current receive sensitivity. Then at block 486, the clients station waits a predetermined period of time, and the process returns to block 480.

Hardware Approach

Figure 5:
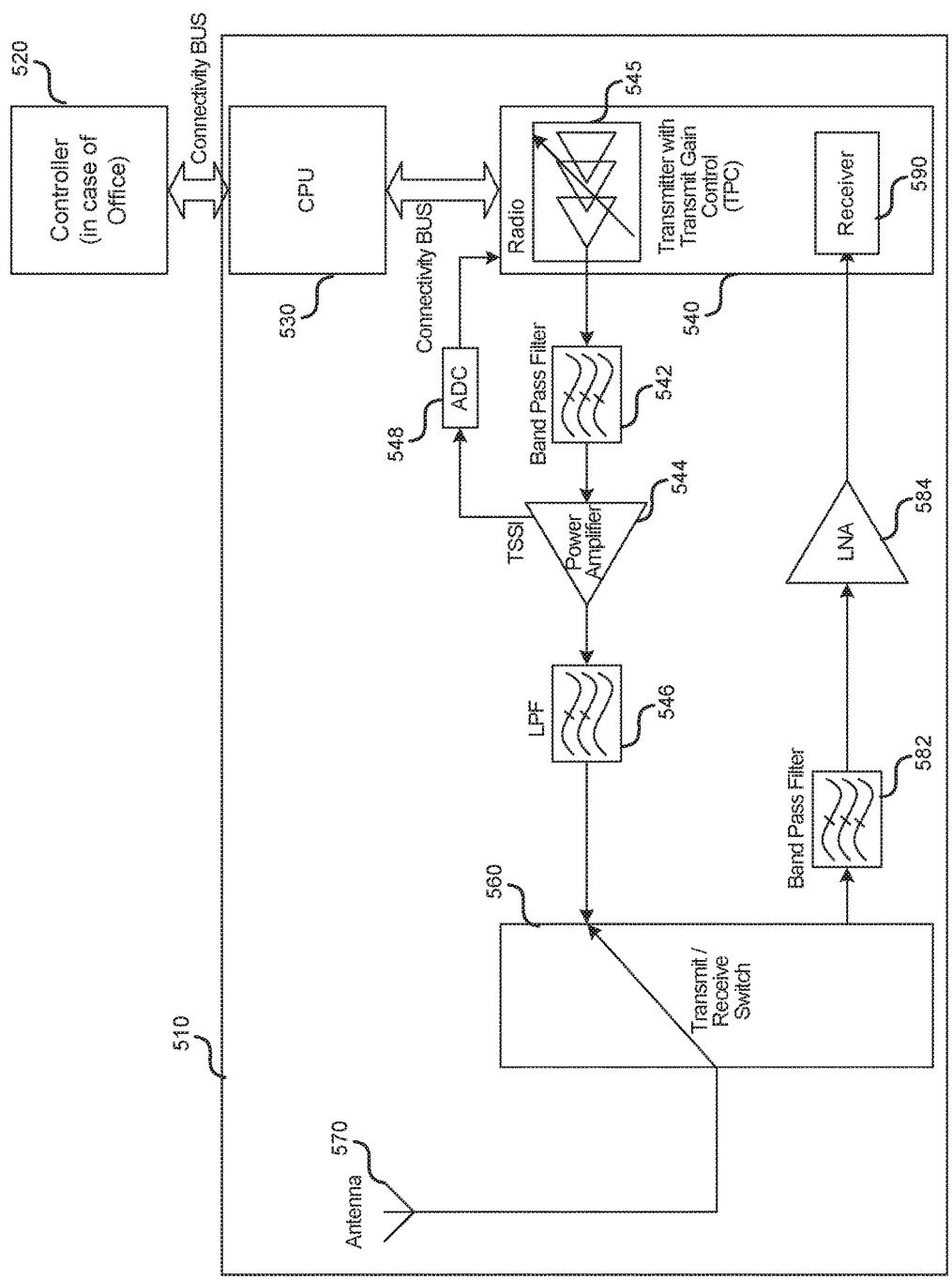
FIG. 5 shows the components of a wireless radio of an access point that has transmit power control (TPC) adjustment capabilities.

FIG. 5 shows the components of a typical access point 510 that includes a wireless radio 540 and has transmit power control (TPC) adjustment capabilities, as defined by the IEEE 802.11h standard. The central processing unit (CPU) 530 of the access point is coupled via a bus to the radio 540 which has a transmitter with transmission gain control 545 and a receiver 590. An adjustable transmission signal is sent from the transmitter with transmission gain control 545 through a band pass filter 542, a power amplifier 544, and a low-pass filter (LPF) 546 before reaching a transmit/receive switch 560. A transmitted signal strength indicator (TSSI) from the power amplifier is also fed to an analog to digital converter (ADC) 548 and sent back to the radio 540.

When the radio 540 is in the transmit mode, the switch 560 provides the transmission signal to the antenna 570 for radiating into the air. When the radio 540 is in the receive mode, the switch 560 provides the signals captured by the antenna 570 to a band pass filter 582 and then a low noise amplifier (LNA) 584 before being sent to the receiver 590 in the radio 540.

When the central processing unit (CPU) 530 of the access point receives a TPC command from the controller 520 to adjust the radio's transmission power level, the transmission gain of the radio 540 is adjusted accordingly. The transmission radius can be adjusted for each client station based on the capabilities of that particular client station. The access point will receive some information from the client at the time of association regarding the client station's capabilities. After association, based on data packet exchange, the rate the access point can transmit to the client station, and the rates and received power it receives from the client station's transmission, the access point can calculate the transmit power that it should use for that client station. In some implementations, the controller 520 can use a look-up table to determine the amount of transmission gain to command the access point CPU 530 to provide. In some implementations, the access point CPU 530 can maintain the look-up table, for example, in local memory, to independently determine the specific amount of transmission gain to provide in the radio 540.

Figure 6:
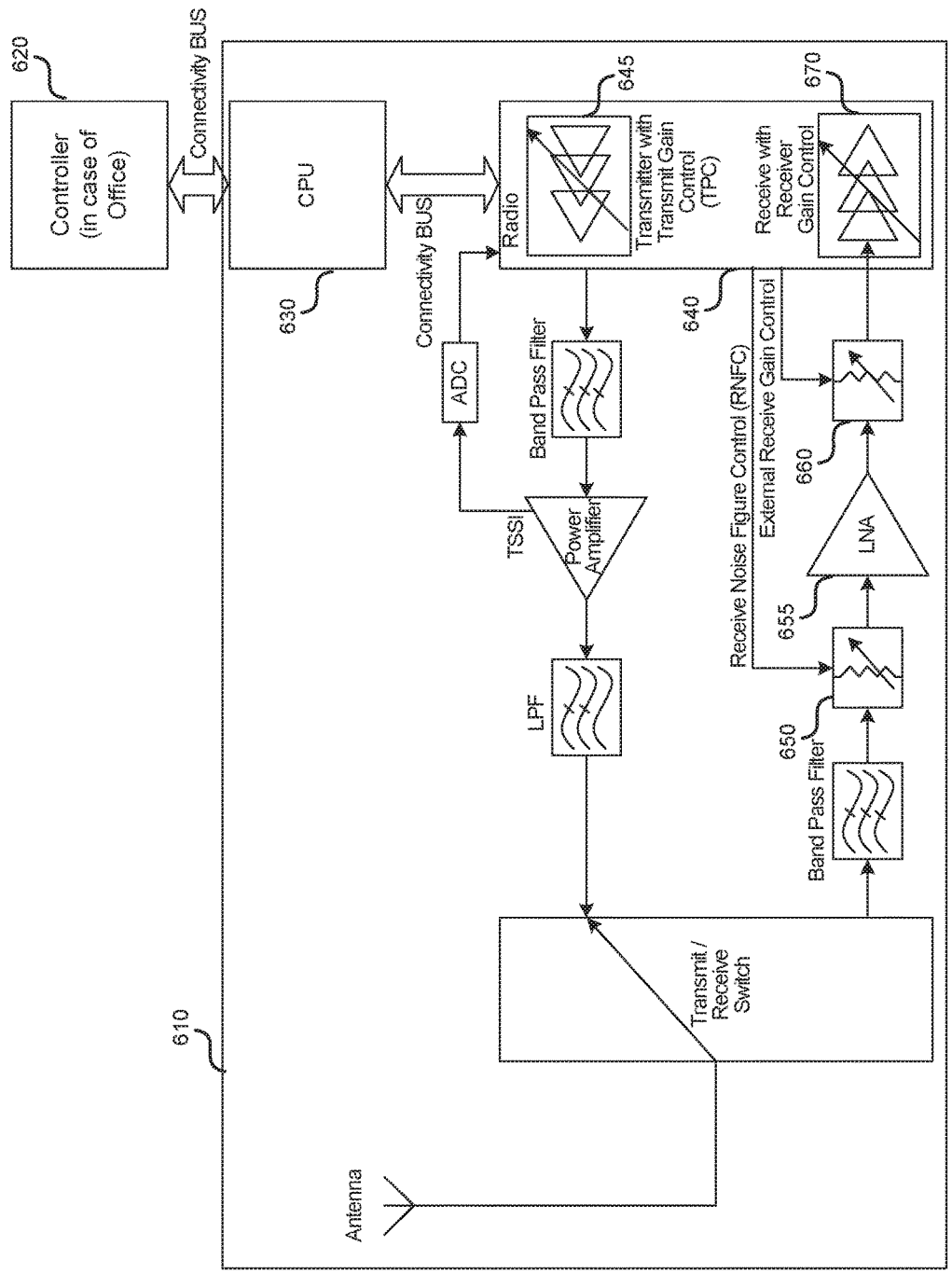
FIG. 6 shows example components of a wireless radio of an access point that has both TPC adjustment capabilities and receiver sensitivity adjustment capabilities.

FIG. 6 shows example components of a wireless radio 640 of an access point that includes both TPC adjustment capabilities and receiver sensitivity adjustment capabilities. The CPU 630 of an access point 610 that can be adjusted to have symmetrical link performance receives commands from the controller 620 to adjust both the transmission gain and the receiver sensitivity. In addition to the traditional components of an access point, described above with respect to FIG. 5, the access point 610 can include a receive noise figure control (RNFC) 650 positioned before the low-noise amplifier 655. Alternatively or additionally, the access point 610 can include an external receive gain control 660 positioned after the low-noise amplifier 655. Both the RNFC 650 and the external receive gain control 660 are adjustable attenuators controlled by a receiver with receiver gain control 670 in the radio 640, and the receiver gain control 670 is responsive to commands from the controller 620. In some implementation, the CPU 630 calculates the receive gain that is optimum for a particular client station and can store the information in a look-up table. In some implementations, the controller 620 can use a look-up table to determine the amount of receive gain to command the access point CPU 530 to provide. In some implementations, the access point CPU 630 can maintain the look-up table, for example, in local memory, to independently determine the specific amount of receive gain to provide in the radio 640.

While FIG. 6 shows example components of a wireless radio of an access point, the example components of the wireless radio can also be used in a client station, except that the CPU 630 operates independently of a controller 620. Instead, the CPU 630 can perform calculations to determine the appropriate transmission gain and receive sensitivity use to communicate with an access point.

Software Approach

Some manufacturers of wireless LAN chipsets that include radio components provide for a programmable gain amplifier that can be controlled externally, using external digital or analog signals. Thus, rather than using hardware external to the LAN chipset, the gain inside the LAN chipset can be adjusted using software. Some wireless chipsets have all or part of the radio frequency (RF) functionality included in them. The RF functionality includes receive components such as low-noise amplifiers (LNA), filters, switches and other programmable or fixed gain elements. The transmit RF functionality includes power amplifiers, filters, switches, and other programmable or fixed gain elements.

When the controller sends a command to the CPU of the access point to adjust the receiver sensitivity, the CPU can either increase the attenuation of the received signal to decrease receiver sensitivity, thereby decreasing the receive radius, or decrease the attenuation of the received signal to increase the receiver sensitivity and the corresponding receive radius. In the case of a client station, the CPU of the client station can perform calculations to determine the appropriate receiver sensitivity use to communicate with an access point.

In some other software controlled embodiments, the receiver may not change the gain at the receiver side but it may choose to control the receive power level or receive modulation level at which it receives or processes a certain packet. The receive power level or receive modulation level may change for different clients. Since the access point will know the identity of the client after processing the physical (PHY) header and when it is processing the MAC header, it can choose what to do with a packet based on its receive power and its identity after it processes the relevant fields in the MAC header.

In some other embodiments, the access point or the client station may choose to use a combined method that changes the programmable gain elements and also applies thresholds at which it receives or processes a packet.

In addition to the receive threshold used for receiving and processing packets, the software may also use a threshold for which it holds NAV or for which it applies ED. Adjustable thresholds for NAV or ED help adjust the access point's behavior in accessing the medium while there is interfering traffic from neighboring access points on the same wireless channel. The access point may choose to transmit a packet when it sees some level of interference. The level of interference the access point can tolerate will depend on the capability of the access point, the client station, and the rate that the access point is using to transmit to a client station and/or the rate that a client station uses to transmit to the access point. Based on this concept, the access point can choose to support an interference channel. Similarly, a client station can also choose to support an interference channel.

Figure 7:
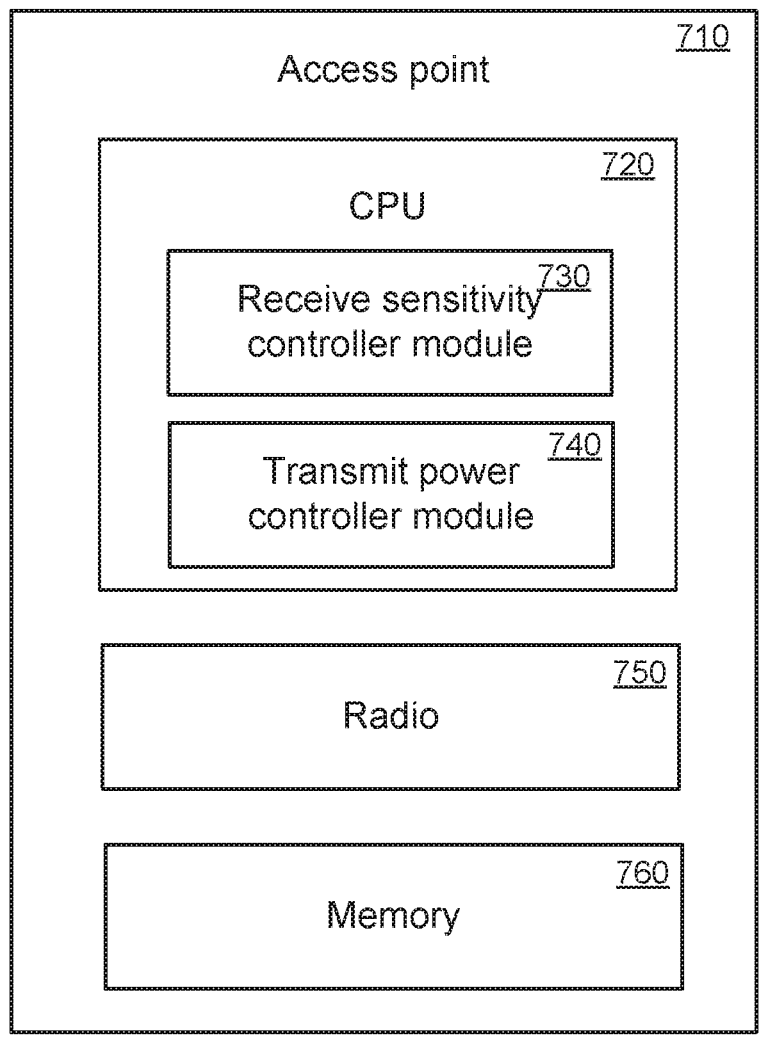
FIG. 7 depicts an architecture of an access point according to an embodiment of the present disclosure.

FIG. 7 is an example of an architecture of the access point 710 configured, for example, to receive commands from a controller to adjust the transmit power and the receive sensitivity of the access point. In the example of FIG. 7, the access point 710 includes a CPU 720, a radio 750, and a memory 760. The CPU 720 can further include a receive sensitivity controller module 730 and a transmit power controller module 740. The CPU 720 and all of the elements included within the CPU 720 are implemented by using programmable circuitry programmed by software and/or firmware, or by using special-purpose hardwired circuitry, or by using a combination of such embodiments. Additional or fewer elements can be included in the CPU 720 and each illustrated component. As used herein, a "module," includes a general purpose, dedicated or shared processor and, typically, firmware or software modules that are executed by the CPU 720. Depending upon implementation-specific or other considerations, the module can be centralized or its functionality distributed. The module can include general or special purpose hardware, firmware, or software embodied in a computer-readable (storage) medium for execution by the CPU 720.

When the CPU 720 receives commands from a controller to increase or decrease the transmit power of the access point, the transmit power module 740 increases or decreases the transmit power gain using hardware in the radio 750 such that the power of the transmitted signals are appropriately adjusted responsive to the controller commands.

Additionally or alternatively, the transmit power module 740 can calculate the transmit power that it should use for a particular client station based upon the capabilities of the client station received at the time of association, the rate at which the access point can transmit packets to the client station, and the rate and received power of packets received from the client station. Based on the calculation, the transmit power module 740 can adjust the transmit power of the access point.

When the CPU 720 receives commands from the controller to increase or decrease the receive sensitivity of the radio 750, the receive sensitivity controller module 730 sends digital or analog signals, depending upon the particular signals expected by the wireless LAN chipset, to adjust a programmable gain to change the receive sensitivity appropriately.

Additionally or alternatively, the receive sensitivity controller module 730 can adjust the receive power level threshold or received modulation level threshold at which it receives or processes packets for each client.

In some implementations, the memory 760 is configured to store a transmit power gain look-up table that can be accessed by the transmit power controller module 740 to determine how much to adjust the transmit power gain hardware in response to the controller's commands. In some implementations, the memory 760 is configured to store a receive sensitivity look-up table that can be accessed by the receive sensitivity controller module 730 to determine the signals to send to the wireless LAN chipset to adjust the programmable gain or attenuation.

While FIG. 7 shows an example architecture of an access point, the same example architecture also applies to a client station, except that the client station CPU 720 does not receive commands from a controller to adjust the transmit power or the receive sensitivity of the client station, rather the transmit power module 740 calculates the transmit power that should be used for a particular client station, and the receive sensitivity controller module 730 adjusts the receive power level or received modulation level at which the client station receives or processes packets for each client.

Maintaining Symmetric Link Performance

Figure 8:
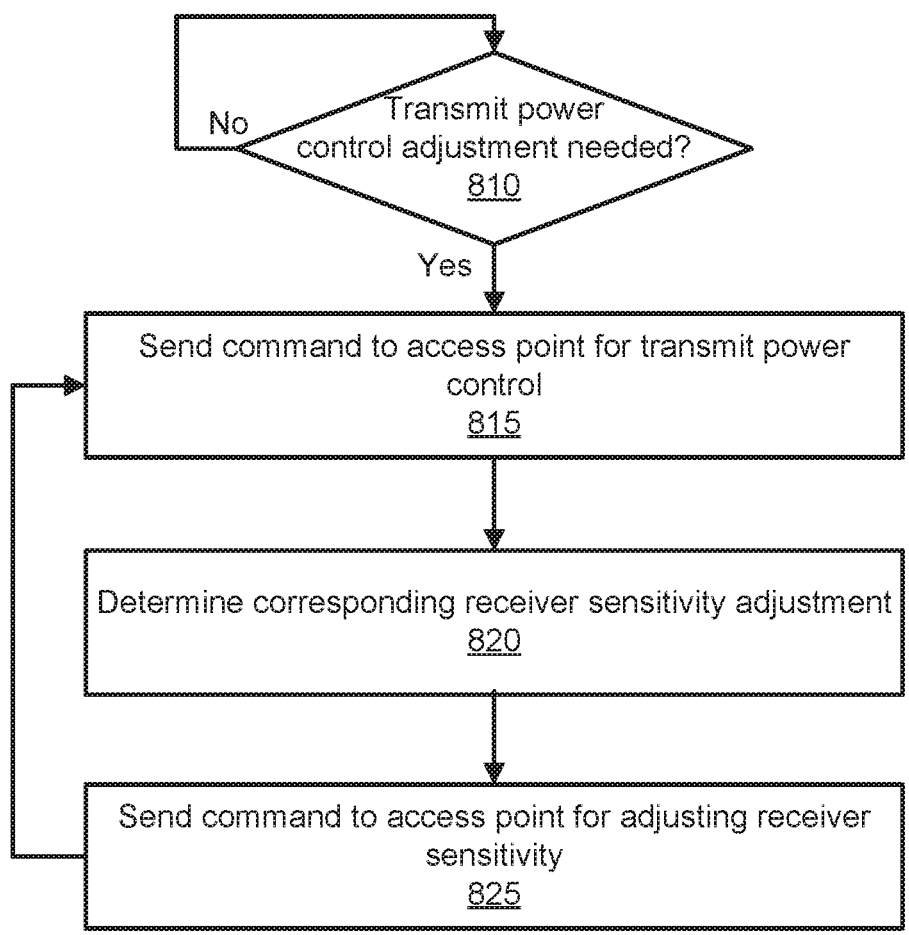
FIG. 8 is a flow diagram illustrating an example process of a controller adjusting the transmit power and the receiver sensitivity of an access point.

FIG. 8 is a flow diagram illustrating an example process of maintaining an access point with symmetric link performance once the symmetry has been established. At decision block 810, the controller determines whether a TPC adjustment is needed for a particular access point. For example, a TPC adjustment may be needed to reduce interference between wireless devices or to limit power consumption of the access point. If no TPC adjustment is needed (block 810—No), the process remains at decision block 810.

If a TPC adjustment is needed (block 810—Yes), at block 815, the controller sends a command to the access point to adjust the transmission power level. Then at block 820, the controller determines the corresponding receiver sensitivity adjustment for the access point, and at block 825, the controller sends the command to the access point to adjust the receiver sensitivity accordingly. The process then returns to decision block 810.

Methods and systems for controlling the transmit power and the receive sensitivity of an access point to provide symmetrical link performance has been described. It will be appreciated by those of ordinary skill in the art that the concepts and techniques described herein can be embodied in various specific forms without departing from the essential characteristics thereof. The presently disclosed embodiments are considered in all respects to be illustrative and not restrictive. The scope of the invention id indicated by the appended claims, rather than the foregoing description, and all changes that come within the meaning and range of equivalence thereof are intended to be embraced.

What is claimed is:

1. An apparatus comprising:
   a radio configured to transmit radio frequency (RF) signals to a wireless device and to receive RF signals from the wireless device; and
   a controller configured to, upon determining that a power level of a probe request received from the wireless device is below a threshold:
      adjust a receive sensitivity to reduce a receive radius; and
      adjust a transmit radius of the radio according to the reduced receive radius.

2. The apparatus of claim 1, further comprising:
   a transmit gain control controllable to adjust a transmit power of the RF signals for the wireless device, wherein the transmit power is adjusted based on whether the wireless device is within the transmit radius of the radio.

3. The apparatus of claim 2, wherein the controller is configured to adjust the transmit radius to match the receive radius.

4. The apparatus of claim 1, wherein the controller adjusts a first power level at which the apparatus holds a network allocation vector (NAV), wherein the NAV is a virtual carrier sensing mechanism as defined in the IEEE 802.11 standard.

5. The apparatus of claim 1, wherein the controller adjusts a second power level, wherein the apparatus uses the second power level as an energy detect (ED) threshold as defined in the IEEE 802.11 standard.

6. The apparatus of claim 1, wherein the apparatus is an access point, and the wireless device is a client station.

7. The apparatus of claim 1, further comprising an antenna configured to capture the received RF signals, a low noise amplifier configured to amplify the received RF signals, and a first attenuator configured to attenuate the received RF signals, wherein the first attenuator is positioned on the same side of the low noise amplifier, and wherein the controller adjusts an attenuation of the first attenuator to adjust the receive sensitivity.

8. The apparatus of claim 7, further comprising a second attenuator configured to attenuate the received RF signals, wherein the second attenuator is positioned on an opposite side of the low noise amplifier from the first attenuator.

9. The apparatus of claim 8, wherein the controller further adjusts an attenuation of the second attenuator to adjust the receive sensitivity.

10. The apparatus of claim 1, wherein the receive radius is reduced so that the probe request can no longer be received from the wireless device.

11. A method comprising:
   transmit, via a radio, radio frequency (RF) signals to a wireless device and to receive RF signals from the wireless device; and
   upon determining that a power level of a probe request received from the wireless device is below a threshold, utilizing a controller to:
      adjust a receive sensitivity to reduce a receive radius; and
      adjust a transmit radius of the radio according to the reduced receive radius.

12. The method of claim 11, further comprising:
adjusting a transmit power of the RF signals for the wireless device, wherein the transmit power is adjusted based on whether the wireless device is within the transmit radius of the radio.

13. The method of claim 12, wherein the controller is configured to adjust the transmit radius to match the receive radius.

14. The method of claim 11, wherein the controller adjusts a first power level that is used for a network allocation vector (NAV), wherein the NAV is a virtual carrier sensing mechanism as defined in the IEEE 802.11 standard.

15. The method of claim 11, wherein the controller adjusts a second power level that is used as an energy detect (ED) threshold as defined in the IEEE 802.11 standard.

16. The method of claim 11, wherein the method is performed by an access point, and the wireless device is a client station.

17. The method of claim 11, further comprising:
capturing, via an antenna, the received RF signals,
amplifying, via a low noise amplifier, the received RF signals; and
attenuating, via a first attenuator, the received RF signals, wherein the first attenuator is positioned on the same side of the low noise amplifier, and wherein the controller adjusts an attenuation of the first attenuator to adjust the receive sensitivity.

18. The method of claim 17, further comprising attenuate, via a second attenuator, the received RF signals, wherein the second attenuator is positioned on an opposite side of the low noise amplifier from the first attenuator.

19. The method of claim 18, wherein the controller further adjusts an attenuation of the second attenuator to adjust the receive sensitivity.

20. The method of claim 11, wherein the receive radius is reduced so that the probe request can no longer be received from the wireless device.

* * * * *